United States Patent [19]
Decoene et al.

[11] 4,149,543
[45] Apr. 17, 1979

[54] STRAW DISCHARGE MEANS OF HARVESTING MACHINES

[75] Inventors: Frans J. G. C. Decoene, Zedelgem; Jan C. van Groenigen, Varsenare, both of Belgium

[73] Assignee: Sperry Rand Corporation, New Holland, Pa.

[21] Appl. No.: 892,528

[22] Filed: Apr. 3, 1978

Related U.S. Application Data

[63] Continuation of Ser. No. 699,111, Jun. 23, 1976, abandoned.

[51] Int. Cl.² .............................................. A01F 12/44
[52] U.S. Cl. ....................................... 130/23; 56/192; 130/27 P
[58] Field of Search .................................. 130/23–26, 130/27 R, 27 P, 27 Q; 56/192, 14.6

[56] References Cited
U.S. PATENT DOCUMENTS

| | | | |
|---|---|---|---|
| 3,714,766 | 2/1973 | Ender et al. | 56/192 |
| 3,946,746 | 3/1976 | DeCoene et al. | 130/27 P |

*Primary Examiner*—Jay N. Eskovitz
*Attorney, Agent, or Firm*—Ralph D'Alessandro; Frank A. Seemar; John B. Mitchell

[57] ABSTRACT

The invention relates to a harvesting machine provided with rotary separating means, grain cleaning means located generally below the rotary separating means and at a central location below and between transversely spaced separator discharge openings, and deflector means to convey and deflect crop material from locations generally below and at both sides of the cleaning means rearwardly and inwardly to a central location generally to the rear of the discharge end of the cleaning means. The deflector means are comprised of overhead and lateral deflectors positioned at predetermined angles to one another to progressively change the direction of movement of the discharged crop material from a generally fore-and-aft path towards the central discharge location.

3 Claims, 5 Drawing Figures

STRAW DISCHARGE MEANS OF HARVESTING MACHINES

This is a continuation, of application Ser. No. 699,111, filed June 23, 1976 and now abandoned.

BACKGROUND OF THE INVENTION

1. Field of the Invention

The present invention relates to harvesting machines such as combine harvesters (also referred to hereinafter as combines), and more particularly to straw discharge means of harvesting machines.

While the terms "grain" and "straw" are used principally throughout this specification for convenience it should be understood that the terms are not intended to be limiting. Thus, "grain" refers to that part of the crop material which is threshed and separated from the discardable part of the crop material which is referred to as "straw".

DESCRIPTION OF THE PRIOR ART

In a combine harvester, the grain is threshed, separated, cleaned, and stored in a grain tank for subsequent transport from the field and this is considered to be the most economical method of harvesting crop material. In the standard commercially available combines, the rotatable threshing cylinder and cooperable concave extend transversely to the direction of movement of the combine. The crop is fed to the threshing mechanism and passed between the concave and the threshing cylinder, whereby it is threshed. The straw is discharged rearwardly of the concave onto reciprocating or oscillating straw walkers which extend longitudinally of the combine. Much of the grain contained in the crop material fed to the threshing mechanism is threshed and separated by that mechanism and some of the remainder is separated from the straw while the latter is on the straw walkers. Straw walkers have proved to be the capacity-limiting component of the standard combine because when operating at high capacity rates, much grain is discharged with the straw to the straw walkers which are unable to cope with the required separation and hence, unacceptable grain losses occur.

Recent developments in combine harvesters have led to a so-called "Axial Flow" type combine harvester, wherein the threshing and separating mechanism extends longitudinally (fore-and-aft) of the machine and generally parallel to the direction of movement and comprises at least one threshing and separating rotor and cooperable concave. The crop material is fed to the forward end of the threshing mechanism and is formed into a mat which passes generally, axially therethrough in a spiral path.

In another approach a conventional transversely-extending threshing cylinder and concave have been combined with an axial flow separating mechanism arranged generally behind the threshing mechanism. In this arrangement the crop material is fed to the forward end of the threshing mechanism and is formed into a mat which passes in generally fore-and-aft direction of the machine between the threshing cylinder and cooperable concave and further in a generally fore-and-aft extending spiral path through the separator mechanism.

In a further embodiment of the foregoing principle, the axial flow type separating mechanism comprises two side-by-side and fore-and-aft extending rotors arranged in a single cooperable casing and the crop material is moved in a spiral path around the two rotors.

In still another approach, the orientation of the axial flow type separating mechanism has been changed so that it extends generally parallel to the threshing mechanism, i.e. transversely of the machine, and has the infeed section thereof generally behind the threshing mechanism with the discharge end in a substantially offset relationship with the threshing mechanism.

In all aforementioned approaches the straw is discharged to the ground, after being subjected to a threshing and separating action in the threshing and separating means, in a single windrow ready for drying if need be, and for subsequent baling by means of any type of baler. However, while all the aforementioned combine harvester structures may have several attractive advantages none of these combines have proved to have an overriding advantage over the others. Indeed, as mentioned above, the straw walkers of conventional combines have proved to be the capacity-limiting component. Also, some of the problems associated with axial flow machines are that the power requirement is greater than with a comparable conventional machine due to the sustained threshing and separating and that it is not always possible to cope with every condition and type of crop material which may be encountered. In the aforementioned approaches wherein conventional threshing means are combined with axial flow type separator means, severe crop feeding problems are often inherent therein. This makes these machines impractical. The asymmetric arrangement of the components according to the approach wherein the threshing and separating means extend parallel to each other has equally several disadvantages such as a complicated structure, an uneven distribution of weight and an uneven loading of the cleaning mechanism. Also, in order to have an appropriate grain separation action, the mat of crop material should move several times around the rotor of the separating mechanism but this requires extra power from the power source and the risk of jamming is increased.

Finally, there is also an arrangement in which a conventional threshing mechanism is combined with a separating cylinder and concave of the same width as the threshing mechanism and extending parallel thereto and arranged to receive the crop discharged from the threshing mechanism in a central section thereof. The separating mechanism is operable spirally to convey part of the crop around the separating cylinder to one end and the remainder to the opposite end of the separating cylinder. However, this arrangement has failed to be successful due to crop feeding problems at the transition between the threshing mechanism and the separating mechanism. Furthermore, this arrangement has also the disadvantage of discharging the straw mat in two separate, spaced and relatively small windrows. This is disadvantageous as during the subsequent baling operation it is difficult, if not impossible, fully to load the baler to its maximum capacity without previously raking two or more neighbouring windrows into a single larger windrow.

The combine harvester according to our copending Canadian application number 203,582 and the corresponding U.S. Pat. No. 3,946,746 comprises a transversely-extending threshing mechanism having a threshing cylinder cooperable with a threshing concave and a rotary separating mechanism of a width greater than that of the threshing mechanism and disposed parallel thereto with its ends extending past the respective ends of the threshing mechanism and being arranged spirally to convey the crop material received from the threshing mechanism to each of its ends while submitting the crop to a separating action.

This separator mechanism may comprise a transversely-extending separating rotor having crop-treating and crop-conveying elements cooperable with a separating concave and operable in use to separate grain from the straw while conveying approximately half the mat of straw in a spiral path to one end for discharge and the remainder of the straw mat in an opposite spiral path to the opposite end for discharge. Preferably, the separating mechanism comprises at least two transversely-extending rotors arranged one behind the other in a single separator casing, part defined by separator concaves. The rotors may be driven in the same direction and the crop is conveyed thereby in spiral paths which extend around both rotors at the inner side of the casing. Preferably the spiral paths do not comprise more than one and a half loops or turns.

The structure of Canadian Application No. 203,582, and U.S. Pat. No. 3,946,746 is an optimum combination of threshing and separating components enabling operation at high capacity levels with comparatively low grain loss percentages. Also, the overall power requirements of the machine are reduced. Furthermore, a regular and fluent flow of crop material through the threshing and separating mechanism is obtained, reducing the likelihood of jamming. Also, fewer small pieces of straw are produced so that the load on the cleaning mechanism is reduced accordingly. With this reduction or elimination of certain disadvantages of known harvesting machines, a greater efficiency is realized whereby a smaller, and therefore more light-weight, machine can be produced for a given capacity, compared to a conventional machine of the same capacity. The smooth flow of crop material also means that a relatively thin straw mat is operated on by the threshing and separating mechanism which results in a more efficient grain separation and hence reduced grain loss without any major sacrifice in the power requirements of the machine.

Nevertheless, a combine harvester with the aforedescribed optimum combination of threshing and separating components also has a disadvantage in that for each run down a field the combine produces two spaced windrows of straw. While these windrows comprise only a small mass of straw material which is disposed in a fluffy manner on the ground ideal for drying, there is a disadvantage in that often drying of the windrows is not necessary and the windrows do not comprise enough straw fully to load a normal sized baler during the subsequent baling operation. When baling, the forward speed of the baler is adjusted so that for a given windrow the baler is operated at its optimum capacity. However, for practical reasons (such as operator's comfort), the baling speed cannot be increased above a certain limit. This limit is soon reached when the windrow density decreases. Another disadvantage is that twin windrows of straw formed during a single run of the combine in question results generally in double the normal straw loss during the subsequent baling compared with a larger single windrow. Furthermore, as the straw is discharged from the combine adjacent the opposed sides thereof, the windrow which is formed adjacent the standing crop may occasionally interfere with the proper operation of the header and the cutter means during a subsequent run of the harvester.

Additionally, the separate deflectors shown in U.S. Pat. No. 3,946,746 and Canadian co-pending patent application No. 203,582 comprise a single, flat, vertically extending plane which creates the greatest angular change in the path of travel of the discharged straw mat or crop material at or near each discharge opening of the separating rotors. This configuration creates a maximum resistance to the rearward movement of the crop material. Having this maximum resistance occur near the discharge vanes of the second separating rotor permits whatever accumulation of crop material that occurs to stop the rearward flow of material and soon jam the discharge vanes and the separating rotors. The larger angular change in the directed path of the discharge crop material caused by the deflectors is critical in tough green crops, such as rye, or extremely moist crops, such as rice, where the discharged crop material will slow up and eventually jam. This jamming obviously, can cause serious damage to the harvesting machine.

The foregoing problems are solved in the design of the machine comprising the present invention by substantially decreasing the angular displacement imparted to the discharged straw mat or crop material immediately after exiting the discharge openings of the separating rotors and by allowing for the progressive and gradual changing of direction of the crop material as it is directed rearwardly in a generally downwardly and inwardly path around the cleaning means toward the discharge outlet at the rear of the harvesting machine.

SUMMARY OF THE INVENTION

It is the object of the present invention to attenuate or eliminate one or more of the aforementioned disadvantages of prior art harvesting machine and, therefore, represents an improvement in the crop material discharge means for a harvesting machine that will progressively change the direction of movement of the crop material from a generally fore-and-aft direction to a rearwardly and generally downwardly and inwardly direction.

According to the present invention there is provided a harvesting machine comprising a transversely-extending threshing mechanism having a thresher cylinder co-operable with a thresher concave, a rotary separating mechanism of a width greater than that of the threshing mechanism and disposed parallel thereto with its ends extending transversely past the respective ends of the threshing mechanism and being arranged spirally to convey the crop material received from the threshing mechanism towards each of its ends while submitting the crop to a separating action. There is also provided grain cleaning means disposed generally below the threshing and separating mechanisms and in between the respective ends of the separating mechanism and having a rear end located generally rearwardly of the separating mechanism, being arranged for receiving grain from the threshing and separating mechanisms for cleaning said grain, and deflector means disposed at each end of the separator mechanism operable to direct the straw mats issuing from the respective end towards each other and towards a location rearwardly of the cleaning means for discharge onto the ground in a single windrow.

Preferably, the deflector means are arranged to form a single windrow desirably positioned on the ground generally centrally of the machine and at the rear end thereof. The deflector means may be provided inside a straw hood mounted at the rear end of the machine and covering both ends of the separating mechaniam and may comprise a plurality of plates disposed at predetermined angles.

In the Drawings

A combine harvester embodying the invention will now be described in greater detail, by way of example with reference to the accompanying drawings, in which.

DESCRIPTION OF THE PREFERRED EMBODIMENT

Figure 1:
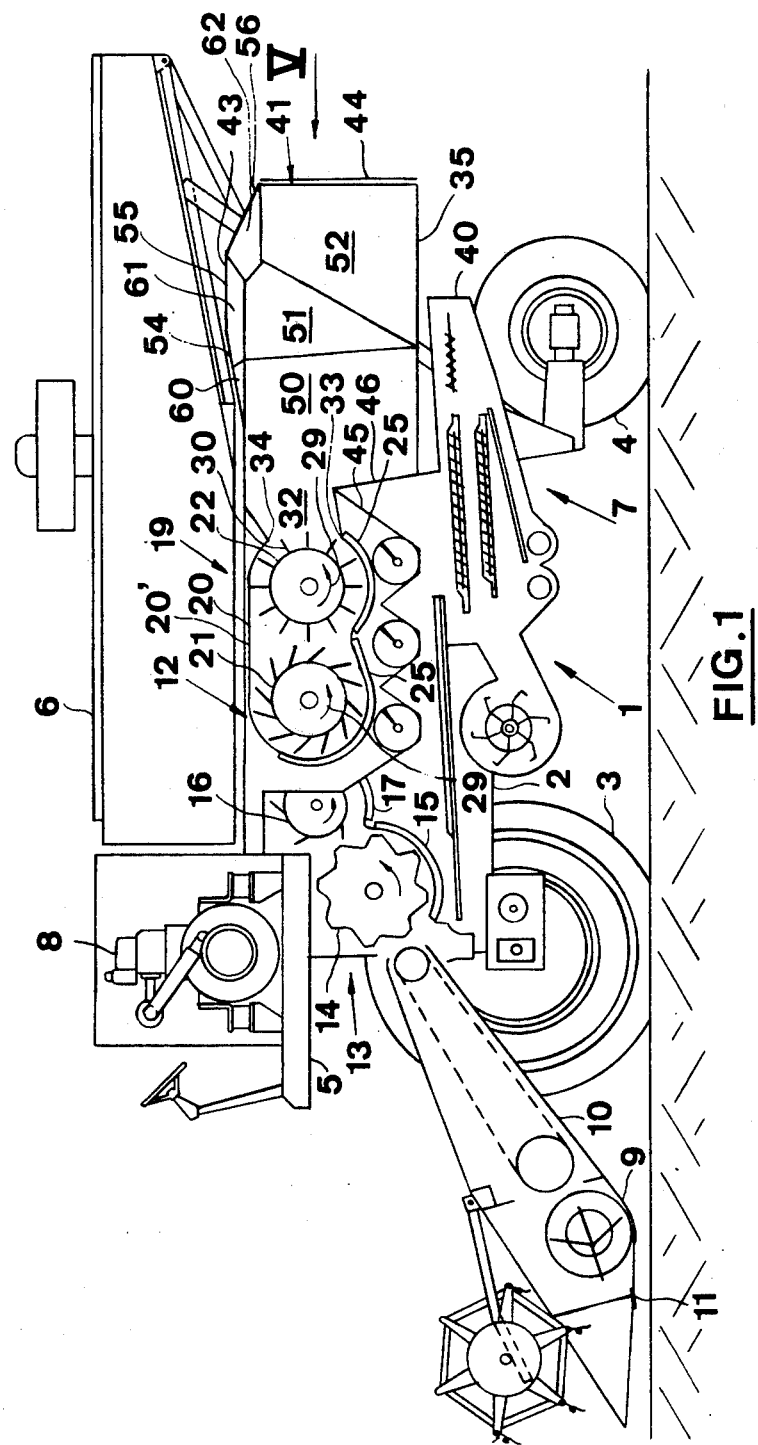
FIG. 1 is a schematic side view of the combine harvester.
Figure 2:
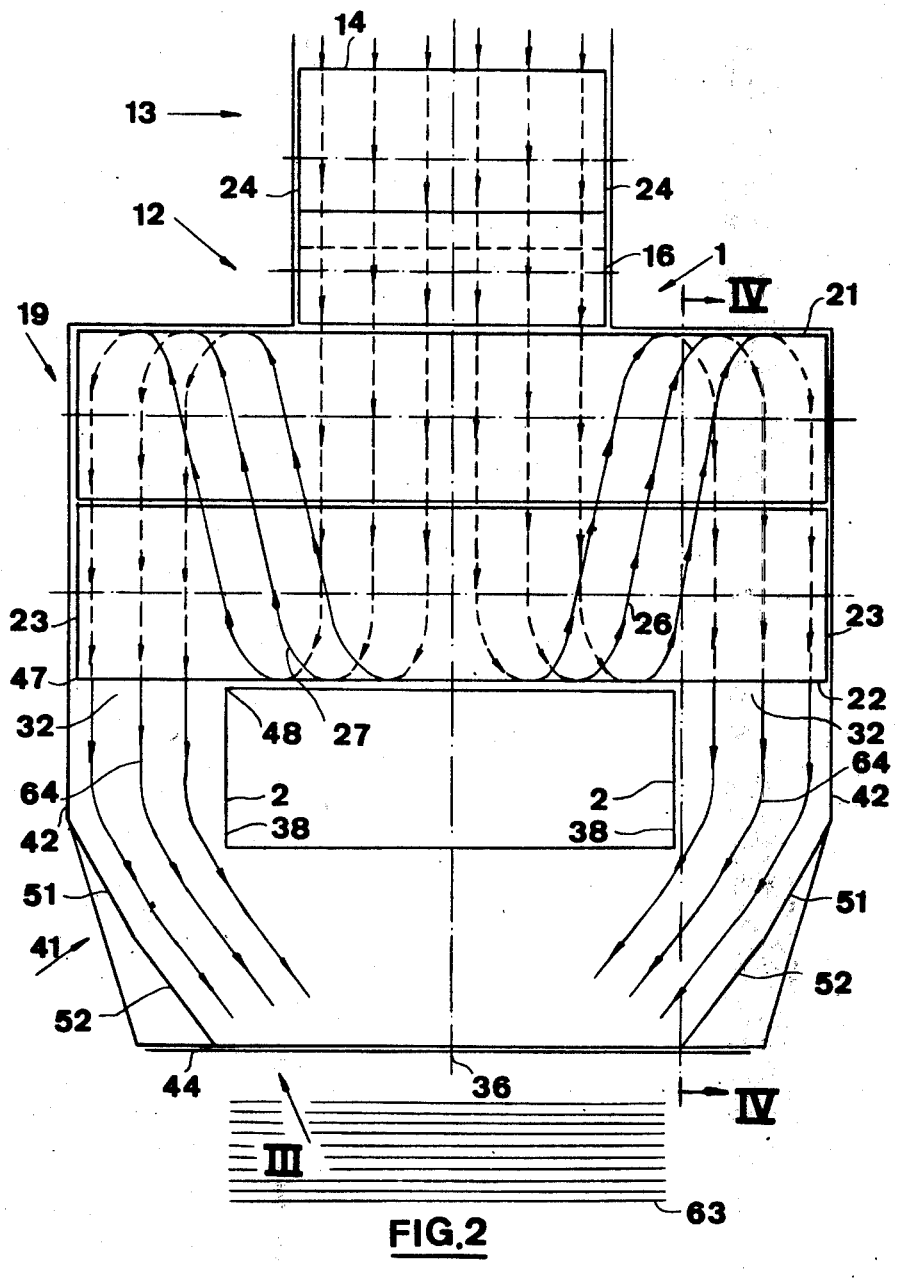
FIG. 2 is a schematic top view of threshing and separating means of the combine of FIG. 1.

With reference to FIGS. 1 and 2 the combine is generally indicated as 1 and comprises a main frame or chassis 2 supported on a pair of drive wheels 3 and a pair of steerable wheels 4 (only one wheel of each pair being shown). Supported on the main frame 2 are an operator's platform 5, a grain tank 6, a grain cleaning mechanism 7, and an engine 8. A conventional header 9 and feed conveyor 10 extend forwardly of the machine and are pivotally secured to the frame 2 for general vertical movement which is controlled by hydraulic cylinders (not shown). The main frame also supports a threshing and separating mechanism generally indicated as 12.

The threshing portion 13 of the mechanism 12 comprises a conventional rotatable thresher cylinder 14 cooperable with a conventional stationary thresher concave 15, the operation of which is generally known in the art.

Rearwardly of the thresher cylinder 14 and the thresher concave 15, there is provided a conventional deflector or so-called straw beater 16 with a cooperable grate 17. The straw beater 16 and grate 17 are of substantially the same width as the threshing mechanism 13 and are arranged behind the latter in a manner to receive the crop issuing therefrom.

Rearwardly of the straw beater 16 a separating mechanism 19 is provided which comprises a single casing or housing 20 in which are mounted two transversely-extending rotors 21 and 22. The width of the separating mechanism 19 substantially exceeds the width of the threshing mechanism 13 but the plane of symmetry of the former coincides with the plane of symmetry of the latter whereby the outer ends 23 of the separating mechanism 19 extend past the respective ends 24 of the threshing mechanism 13. (FIG. 2).

The transversely-extending separating rotors 21, 22 are arranged one behind the other inside the casing 20 part of which is defined by separator concaves 25. The rotors 21, 22 are driven in the same direction 29 and comprise crop treating and crop conveying elements cooperable with the separating concaves 25 and operable in use to separate grain from the straw while conveying approximately half the mat of straw in a spiral path 26 around both the rotors at the inner side of said casing 20 and to one end of the separating mechanism 19 for discharge, and the remainder of the straw in an opposite spiral path 27 around both rotors to the opposite end for discharge.

For a further detailed description of the threshing and separating means 12 and the operation thereof, reference is made to Canadian Parent Application No. 203,582 and corresponding U.S. Pat. No. 3,946,746.

Figure 3:
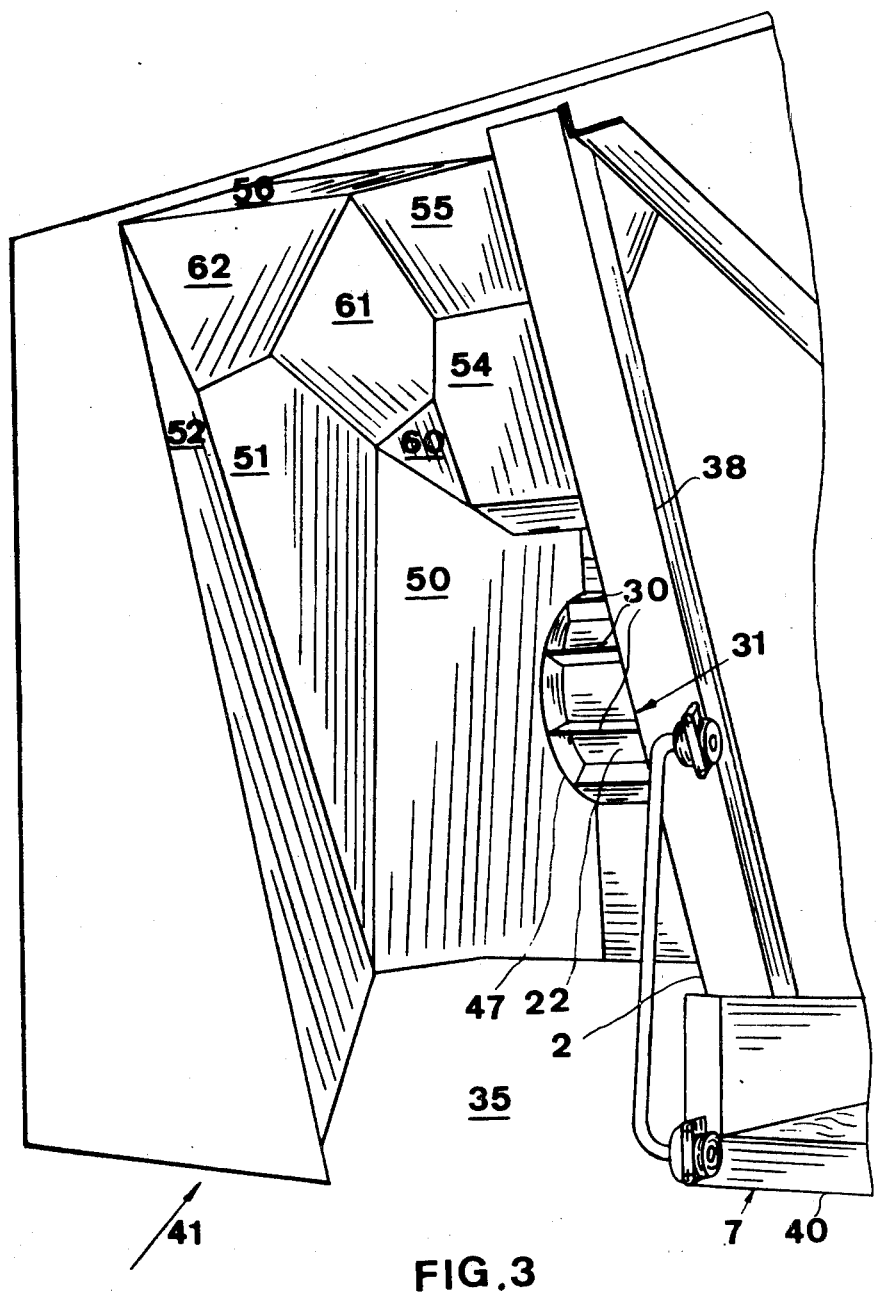
FIG. 3 is a schematic perspective view generally in the direction of arrow III in FIG. 2 but with a portion broken away for clarity.
Figure 4:
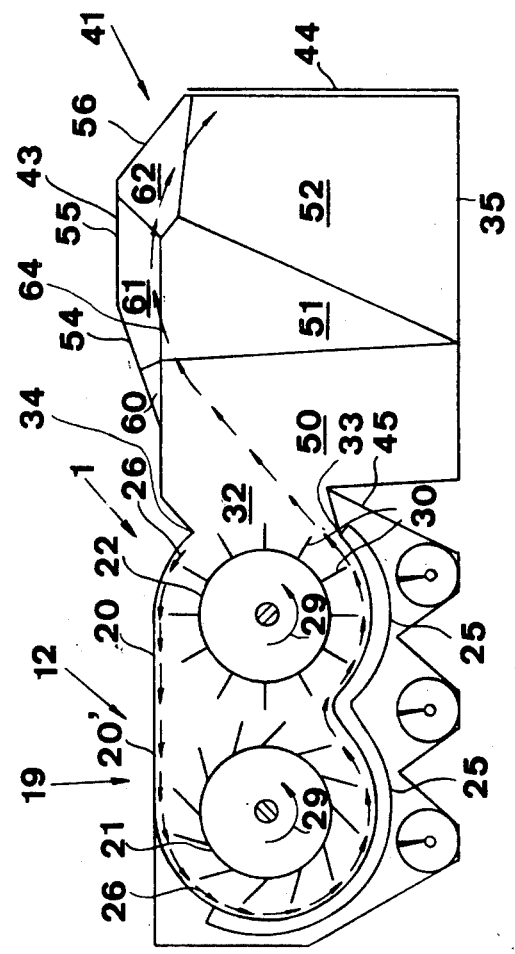
FIG. 4 is a schematic sectional view taken along the line IV—IV of FIG. 2.
Figure 5:
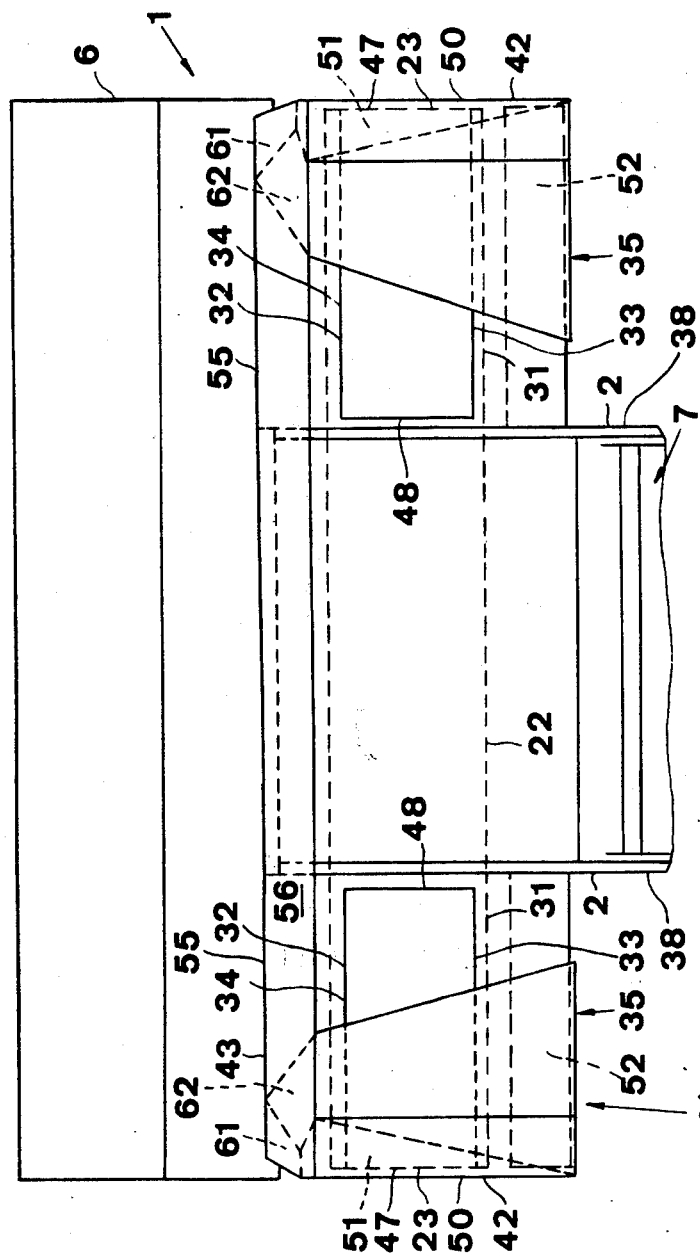
FIG. 5 is a schematic rear view in the direction of arrow V in FIG. 1 with a portion broken away for clarity.

With reference to FIGS. 1, 3, and 4, the rotor 22 supports a number of discharge vanes 30 at each end which vanes extend generally axially of the rotor over an area 31 and generally radially outwardly from the rotor. The casing 20 comprises rearwardly-facing generally rectangular discharge openings 32 (FIG. 5) adjacent its opposite sides and which have a width generally corresponding to the axial extent 31 of the vanes 30 of the rotor 22. The lower and upper transverse edges 33 and 34, respectively, of the discharge openings 32 are generally defined by the rear edges of the separator concaves 25 and the rear edges of a removable top cover plate 20' for the rotors 21, 22. The outer and inner sides 47, 48 respectively, of the discharge openings 32 are located adjacent and inside the corresponding outer ends 23 of the separating mechanism 19 and adjacent and outside side panels 38 of the combine frame 2. Portions of the separator concaves 25 extend in between the spaced discharge openings 32 and are shielded by a forwardly and downwardly inclined rear grain collecting shute 45 for deflecting grain separated at this location to the cleaning means 7. The discharge openings 32 are located generally above the level of the cleaning means 7 and at a location forwardly of a discharge end 40 thereof.

Rearwardly of the separator means 19 there is provided a straw hood generally indicated at 41 and having rearwardly extending side walls 42, an upper wall 43 and a transversely-extending generally upright rear wall 44. The straw hood 41 has a downwardly-facing discharge opening 35 extending above and partially rearwardly of the cleaning means 7. The discharge opening 35 has a plane of symmetry generally coinciding with the plane of symmetry 36 of the separating mechanism 19 and the cleaning means 7. At its forward end, the straw hood 41 is attached to the combine framework 2 so that forward edges 46 of the straw hood side walls 42 are positioned adjacent the outer sides 47 of the separator discharge openings 32.

Inside the straw hood 41 deflector means are provided in the form of a series of generally upright deflector plates 50, 51 and 52 (FIG. 3) attached to the hood rearwardly of each separator discharge opening 32. These deflector plates 50, 51, 52 are inclined with respect to each other and the plates 51-52 are also inclined with respect to the plane of symmetry 36 at predetermined angles. The deflector plate 51 has the smallest inclination while the deflector plate 52 has the largest inclination relative to the plane of symmetry 36. Further deflector plates 54, 55 and 56, extend generally transversely of the combine and above each separator discharge opening 32. When seen in a fore-and-aft sectional view, the deflector plates 54, 55, 56 form a generally arcuate guide surface which faces downwardly as seen in FIG. 3. Further deflector plates 60, 61 and 62 are generally inclined relative to the plane of symmetry 36 as well as to the transverse horizontal plane, and connect the deflector plates 50, 51, and 52, with the deflector plates 54, 55 and 56. All together, the respective sets of deflector plates form generally curved guide surfaces at the corresponding ends of the separator mechanism 19 with their open ends facing rearwardly and downwardly on the one hand and inwardly on the other hand as seen in FIG. 3. These curved guide surfaces, together with the respective side panels 38 form discharge ducts for the straw mats discharged from the separator mechanism through the discharge openings 32.

OPERATION

In operation of the combine, the machine is propelled forwardly over the field and the crop material to be harvested is severed from the stubble by a sickle bar cutter 11 on the header 9 and is conveyed by the header and the conveyor 10 in a generally flat mat extending over the full width to the threshing and separating mechanism 12. The crop material received within the threshing and separating mechanism 12 is threshed, that is to say, the crop material (which may be wheat, corn, rice, soybeans, rye, grass seed, barley, oats, or other similar crop materials) is rubbed and beaten whereby the grain (as herein defined) is loosened from the straw (also as herein defined). The thresher cylinder 14 is rotated at a relatively high speed and propels the crop in a rearward direction for passing between the thresher cylinder 14 and concave 15 while separating already a major percentage of the threshed grain from the straw through the concave 15. The straw mat is passed from the thresher cylinder 14 and thresher concave 15 in a rearward and upward direction towards the straw beater 16 which is operative to deflect the straw mat in a rearward direction between itself and the cooperable grate 17 and to pass it on to the separating mechanism 19. The width of the straw mat remains generally unchanged while passing from the feed conveyor 10 to the separating mechanism 19.

The crop-treating and crop-conveying elements on the rotors 21, 22 and the cooperable separator concaves 25 are operable in use to separate further grain from the straw while conveying approximately half the mat of straw in a spiral path 26 to one end and the remainder of the straw mat in an opposite spiral path 27 to the opposite end of the separator.

The grain which has been separated from the straw falls onto the grain cleaning mechanism 7 which includes means to separate chaff from the grain and means to separate unthreshed material (known in the art as tailings) from the grain. The clean grain is then elevated to the grain tank 6 and the tailings are returned to the threshing and separating mechanism 12.

Finally the two straw mats are discharged by the discharge vanes 30 in a rearward and upward direction 64 (FIG. 4) through the respective discharge openings 32 at a relatively high speed and with a relatively high force. Thus the mats are projected against one or more of the aforementioned deflector plates 50, 51, 52, 54, 55, 56, 60, 61, 62, and guided and deflected thereby both downwardly and inwardly and generally around the cleaning mechanisms and towards a location generally rearwardly of said cleaning mechanism 7 for discharge onto the ground. Thus the two portions of the straw mat are discharged from the separator mechanism 19 initially spaced from each other but eventually being deposited onto the ground in a single windrow 63 (FIG. 2) generally centred on the plane of symmetry 36 due to the action of the deflector plates. Thus, the above discussed disadvantages are avoided with the present invention. Moreover, the straw hood 41 is considerably shorter than that of a conventional combine harvester employing straw walkers as the separating mechanism.

We claim:

1. An agricultural harvesting machine comprising:
   a chassis adapted to travel across a field,
   means for conveying crop material from the field to the chassis,
   means transversely mounted to said chassis rearwardly of the conveying means for threshing grain from the crop material,
   a separator casing mounted to said chassis rearwardly of the threshing means and disposed substantially parallel thereto for receiving said crop material from the threshing means over a width substantially corresponding to the width of the threshing means, the casing having ends extending over substantially equal distances laterally beyond the respective ends of said threshing means and comprising concaves mounted to said chassis to enable separated grain to pass therethrough, said casing further including a forwardly facing opening having a width substantially corresponding to the width of the threshing means and adapted to receive crop material from said threshing means, said casing also including rearwardly facing discharge openings positioned at either end of said casing and transversely offset relative to the infeed opening for discharging crop material from said casing,
   means rotatably mounted within said casing and operably associated therewith to spirally convey crop material laterally in layers of substantially half the width of the threshing means towards each of its ends while submitting said layers of material to a separating action and to discharge said layers through said discharge openings,
   grain cleaning means disposed generally below the threshing means and the separator casing and inbetween the discharge openings of said separator casing, said grain cleaning means having a rear end located generally rearwardly of said discharge openings and being arranged for receiving grain from the threshing means and separator casing and for cleaning said grain, and
   deflector means comprising a plurality of deflector plates disposed rearwardly of each discharge opening of the separating casing and operable to direct said layers of crop material issuing from the respective discharge openings towards each other at a location rearwardly of the cleaning means for discharge onto the ground into a single windrow.

2. An agricultural harvesting machine as described in claim 1 wherein the rotatable separating means within the separator casing comprise a rotor having at each end a plurality of vanes operable to discharge crop material through the respective discharge openings.

3. An agricultural harvesting machine for separating grain from crop material having transversely mounted threshing means, transversely mounted separating means with at least one cylindrical rotor, transversely opposed discharge openings associated with said separating means, grain cleaning means generally disposed below said threshing and said separating means and between said discharge openings, the improvement comprising:
   deflector means comprising a plurality of deflector plates positioned at predetermined angles with respect to each other and located rearwardly and adjacent each of said discharge openings operable to progressively change downwardly and inwardly the direction of the nongrain portion of the crop material discharged thereagainst around said grain cleaning means to a location rearward of said cleaning means for discharge onto the ground in a single windrow.

* * * * *